(No Model)
T. TAYLOR & J. B. WRIGHT.
DRESS GUARD FOR BICYCLES.
No. 583,313. Patented May 25, 1897.
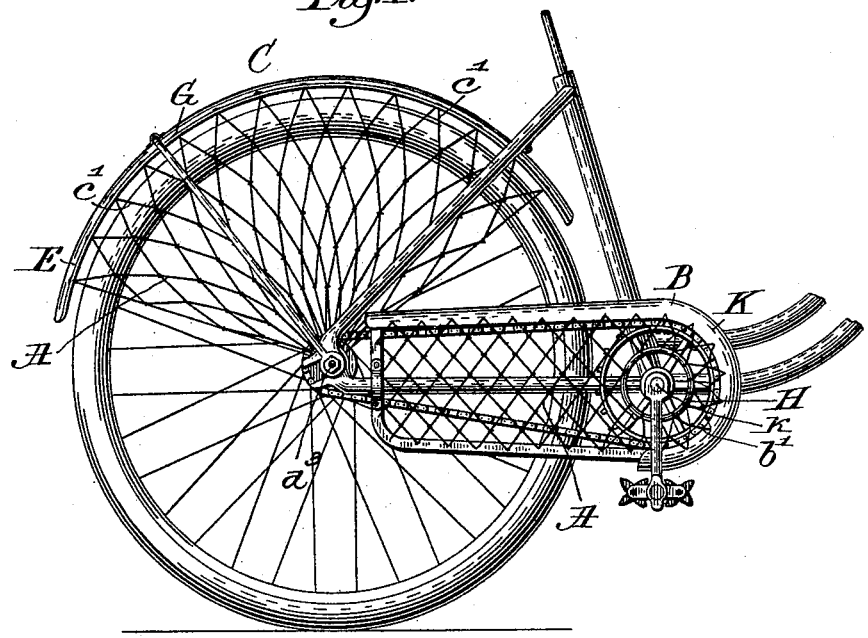
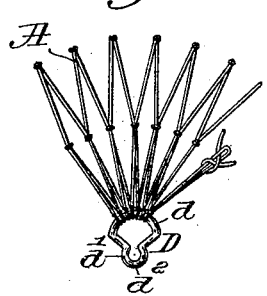
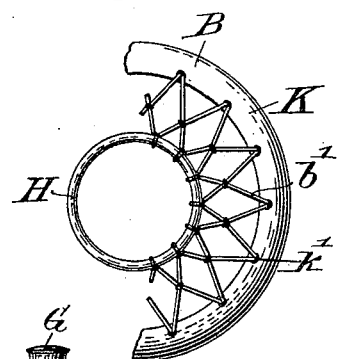
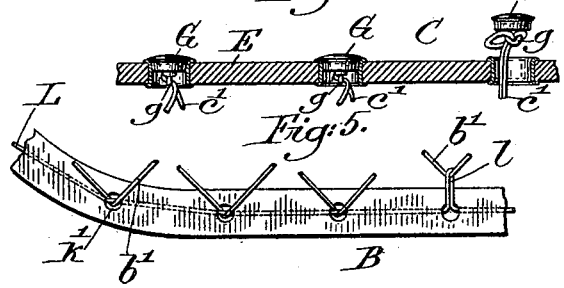
Witnesses.
Fred S. Gunlach.
Edward F. Allen.
Inventors.
Thomas Taylor.
John B. Wright.
by Crosby Gregory. Attys.

UNITED STATES PATENT OFFICE.

THOMAS TAYLOR AND JOHN B. WRIGHT, OF CHELSEA, MASSACHUSETTS.

DRESS-GUARD FOR BICYCLES.

SPECIFICATION forming part of Letters Patent No. 583,313, dated May 25, 1897.

Application filed November 9, 1896. Serial No. 611,471. (No model.)

*To all whom it may concern:*

Be it known that we, THOMAS TAYLOR and JOHN B. WRIGHT, both of Chelsea, in the county of Suffolk and State of Massachusetts, have invented an Improvement in Dress-Guards for Bicycles, of which the following description, in connection with the accompanying drawings, is a specification, like letters on the drawings representing like parts.

Ladies' bicycles are commonly provided with dress-guards to protect the dress from being soiled or injured by contact with the rear wheel and driving mechanism, these guards being of various kinds, including guards made by lacing a cord back and forth to cover the desired parts. These latter dress-guards are not easily put on and removed from the bicycle, and if one strand thereof is broken the entire guard becomes slack and inefficient.

It is the object of our invention to provide a simple, cheap, and efficient dress-guard in the form of a net and capable of being quickly and readily secured in place or removed therefrom and which, moreover, if injured in one part is not affected elsewhere.

Our invention will be more fully understood in the course of the following description and will be pointed out in the accompanying claims.

In the drawings illustrative of the preferred form of our invention, Figure 1 represents in side elevation, parts being broken away, an ordinary bicycle provided with our improved dress-guard. Figs. 2 and 3 show in side elevation enlarged details of portions of the guard. Fig. 4 is a sectional detail showing one of the securing-caps in operative position and also illustrating the method of attaching the same to the net. Fig. 5 is an enlarged detail, in side elevation, showing the means of securing the guard to cover the sprocket-wheel and chain.

In the present embodiment of our invention A designates a net composed of strong firm cords formed into a net of suitable mesh, preferably by firmly knotting the cords at their junctures.

The guard comprises two portions, the front portion B, covering the sprocket-wheel and chain and conforming thereto in shape, and the rear portion C, extending out in fan shape to cover the upper part of the rear wheel.

The portion C has all the strands $c'$ at its lower end gathered in and looped over a holding-ring D, preferably arched at $d$ and having converging lower sides $d'$ terminating in an open eye $d^2$ to catch under a hook, screw, or other fastening $d^3$ on the frame of the bicycle.

Usual eyelets $e$ are provided in the mud-guard E, and through these the upper loops or ends $c'$ of the upper meshes are inserted and hitched over the securing-caps G by being passed through the eyes $g$ thereof and thrown over the caps, as shown in Fig. 4, and pulled tight.

The mud-guard and cord will yield sufficiently to permit this fastening, as described, of the loops and their caps, and will then spring back again to their normal positions, thereby snugly seating the caps in the eyelets and maintaining the guard taut.

The forward portion B of our invention has a rigid ring H secured therein by the loops $b$ to fit loosely around the axle $k$ of the sprocket-wheel, the netting B being crossed and knotted the same as already described. The peripheral loops $b'$ of the portion B are inserted through apertures $k'$ in the chain-guard K and secured by means of a lace L run therethrough, as shown in Fig. 5. It is essential that the portion B, covering the sprocket-chain, shall have no projecting fastenings that might catch the dress and shall under no circumstances become slack, for the reason that in case it did become slack it might be caught by the moving sprocket-chain and cause an accident. Therefore we employ the lace L and preferably construct the net of the portion B so that one or more loops $b'$ will be removed somewhat from the guard K, as indicated at $l$, Fig. 5, when the net is normally drawn taut. By this provision if a mesh or loop of the portion B should break the net could still be kept taut simply by tightening the lace L, thereby stretching the net toward the point $l$, and thereby taking up any slack that might have occurred.

In case it is desired to remove our improved dress-guard for replacing it with a new one or for washing or repairing it all that is necessary to be done is to untie and pull out the lacing L from the forward portion B and lift up and unhitch the securing-caps G from the rear portion C.

Our invention renders it unnecessary to remove the whole dress-guard to make a single repair. For instance, if one strand should get broken one or two adjacent securing-caps G are loosened in order to give the requisite slack for putting in a new strand. The latter is then knotted into place to complete the broken mesh or meshes, and the caps are again fastened, thereby restoring the completed guard to its normal taut condition.

Various changes and modifications in form and arrangement of parts may be resorted to within the scope of our invention.

Having fully described our invention, what we claim, and desire to secure by Letters Patent, is—

1. The combination with the mud-guard of a bicycle, said mud-guard being provided with eyelets, of a netted fabric of proper shape, said fabric having loops along its edges, adapted to be inserted through said eyelets, and securing-caps, provided with eyes at their under sides to receive the ends of said loops, the loops being hitched over said caps, and the latter being adapted to fit snugly into said eyelets, substantially as described.

2. The combination with a bicycle, and its mud-guard, of a dress-guard, comprising a forward portion, shaped to cover the driving mechanism, and a rear portion, triangular in shape, to inclose the upper part of the rear wheel, said two portions consisting of netted fabric, and being each provided with a ring permanently secured thereto, and having loops along their edges, adapted to be inserted through apertures provided therefor in the mud-guards, securing-caps, provided with eyes at their under sides, and having the loops of the said rear portion hitched thereto, and a lacing passed through the loops of the said forward portion, the latter when normally taut having certain of its said loops falling short of the mud-guard, the lacing thereat entering through the mud-guard to secure the said loops, thereby providing a quick tightening means, substantially as described.

3. The combination with a perforated mud-guard of the driving mechanism of a bicycle, of a netted fabric of proper shape to cover said driving mechanism, a ring permanently mounted in said fabric to loosely surround the pedal-shaft of the bicycle, said fabric having loops along its edges, adapted to be inserted through said perforations, and a lacing to enter through said respective loops and secure the same to the mud-guard, substantially as described.

In testimony whereof we have signed our names to this specification in the presence of two subscribing witnesses.

THOMAS TAYLOR.
JOHN B. WRIGHT.

Witnesses:
GEO. H. MAXWELL,
JOHN C. EDWARDS.